(12) United States Patent
Kohls et al.

(10) Patent No.: US 6,907,573 B2
(45) Date of Patent: Jun. 14, 2005

(54) INTELLIGENT CONSTRAINT DEFINITIONS FOR ASSEMBLY PART MATING

(75) Inventors: Scott T. Kohls, Canton, MI (US); Gary R. Smith, Commerce Township, MI (US)

(73) Assignee: Autodesk, Inc., San Rafael, CA (US)

( * ) Notice: Subject to any disclaimer, the term of this patent is extended or adjusted under 35 U.S.C. 154(b) by 560 days.

(21) Appl. No.: 09/966,656

(22) Filed: Sep. 28, 2001

(65) Prior Publication Data

US 2003/0067487 A1 Apr. 10, 2003

(51) Int. Cl.[7] .............................. G06F 3/00; G06F 9/00; G06F 17/00
(52) U.S. Cl. ........................ 715/764; 715/848; 715/852; 715/809; 715/836; 715/964; 715/975; 715/976
(58) Field of Search ................................ 345/420, 700, 345/764; 700/98

(56) References Cited

U.S. PATENT DOCUMENTS

| | | | |
|---|---|---|---|
| 5,123,087 A | 6/1992 | Newell et al. | 345/862 |
| 5,133,052 A | 7/1992 | Bier et al. | 715/530 |
| 5,444,836 A | 8/1995 | Hollingsworth et al. | 345/634 |
| 5,572,639 A | 11/1996 | Gantt | 345/651 |
| 5,577,189 A | 11/1996 | Gay et al. | 345/800 |
| 5,815,154 A | 9/1998 | Hirschtick et al. | 715/853 |
| 5,894,310 A | 4/1999 | Arsenault et al. | 345/679 |
| 6,016,147 A | 1/2000 | Gantt | 345/420 |
| 6,219,049 B1 * | 4/2001 | Zuffante et al. | 345/764 |
| 6,219,055 B1 | 4/2001 | Bhargava et al. | 345/850 |
| 6,559,860 B1 * | 5/2003 | Hamilton et al. | 345/700 |
| 6,611,725 B1 * | 8/2003 | Harrison et al. | 700/98 |

OTHER PUBLICATIONS

Autodesk Inventor—Release 3, "Learn about arranging components in patterns." 1 pg. Jun. 23, 2000.
Autodesk Inventor—Release 3, "To arrange features in a rectangular pattern," 1 pg. Jun. 23, 2000.
Autodesk Inventor—Release 3, "To arrange components in a circular pattern," 1 pg. Jun. 23, 2000.
Autodesk Inventor—Release 3, "To arrange components in a rectangular pattern," 1 pg. Jun. 23, 2000.
Autodesk Inventor—Release 3, "Pattern components," 1 pg. Jun. 23, 2000.
Autodesk Inventor—Release 3, "To arrange features in a circular pattern," 1 pg. Jun. 23, 2000.
Autodesk Inventor—Release 3, "Rectangular pattern," pp. 2 Jun. 23, 2000.
Autodesk Inventor—Release 3, "Learn about arranging features in patterns," 1 pg. Jun. 23, 2000.
Autodesk Inventor—Release 3, "Circular pattern," 2 pgs. Jun. 23, 2000.
Autodesk Inventor—Release 3, "Getting Started" pp. 20 Jun. 23, 2000.
SolidWorks Corporation, "Solidworks Corporation Introduces Solidworks © 1999," http://www.solidworks.com/Autorelease/html/prSolidWorks99.htm pp. 4 ©1999.

* cited by examiner

*Primary Examiner*—Kristine Kincaid
*Assistant Examiner*—Boris Pesin
(74) *Attorney, Agent, or Firm*—Gates & Cooper LLP

(57) ABSTRACT

One or more embodiments of the invention provide a method, apparatus, and article of manufacture for defining mating properties of a graphical component in a computer-implemented drawing program. An option to create a first constraint interface for a first geometric characteristic of a first component is initiated. In response to the initiation, a dialog window for specifying settings for the first constraint interface regardless of whether a second constraint interface is currently displayed is displayed. The settings define mating properties for how the first geometric characteristic of the first component mates with the second constraint interface. Once specified, the first constraint interface of the first geometric characteristic is persisted with the first component.

95 Claims, 13 Drawing Sheets

Displayed glyphs 1004    1002

304

During constraint place, glyph is selectable and highlights when under cursor

First selection is displayed in "selected" color

Second selection is highlighted under cursor

1006

Two individual glyphs replaced by single "consumed" glyph

INTELLIGENT CONSTRAINT DEFINITIONS FOR ASSEMBLY PART MATING

BACKGROUND OF THE INVENTION

1. Field of the Invention

The present invention relates generally to computer-implemented drawing programs, and in particular, to a method, apparatus, and article of manufacture for defining how parts will be positioned or constrained when they are used in an assembly independent of any knowledge of what assemblies they will be used in.

2. Description of the Related Art

Multiple components/parts are commonly displayed in computer drawing programs such as solid modeling or computer aided design (CAD) programs. The multiple components are often related to each other and need to be placed in a drawing based on the relationship. In the prior art, the relationship and mating information for positioning parts could not be captured until the assembly was being designed and both parts were being placed. However, a part is often designed without knowing how it will eventually be used in an assembly. Accordingly, the prior art does not provide the ability for part designers to establish mating information or information on how the part will interface with other parts during the design process. Such problems may be better understood by describing drawing programs and components/parts used in a drawing program.

Computer-implemented drawing programs are often used to create, view, and modify solid models, assemblies, diagrams, flow charts, blue-prints, etc. (collectively referred to as drawings) in both two dimensions (2D) and three dimensions (3D). The drawings comprise one or more graphical elements (referred to as components or parts) arranged in a defined format. In turn, the graphical elements may comprise one or more smaller graphical elements/entities (referred to as features).

Components/parts may often be related to each other. For example, one part (e.g., a bolt) may be related or intended to fit into another part (e.g., a washer or nut). To establish the relationship, constraints may be placed on the parts. For example, a bolt may be constrained to the washer. The constraints between the parts are based on features in the related parts. For example, the center axis feature of the bolt may be constrained to the center axis feature of hole in the washer. Thus, the constraints are often specified for particular features in a part.

Constraining one or more parts to a particular position or relationship with another part (also referred to as mating information) are available in the prior art. However, in the prior art, the mating information for positioning parts could not be captured until the assembly was being designed. In other words, both parts had to be displayed at the same time in order to establish a relationship between them. Typically, a first part was placed in the drawing and as a second part was being placed, a relationship between the parts could be determined and set. Mating properties of a particular part could not be established prior to placement of the part itself.

SUMMARY OF THE INVENTION

One or more embodiments of the invention provide a method, apparatus, and article of manufacture for defining mating properties of a graphical component in a computer-implemented drawing program such as a solid modeling program. When creating a part, a dialog window is displayed that permits the user to adjust settings for the mating properties. Once a feature of the component is selected and settings are accurate, the mating properties are stored in an object (referred to as a constraint interface, interface constraint, mate, or iMate) that persists with the component.

Glyphs/icons are used to indicate the location and existence of a constraint interface. The glyphs may also reflect the current use and defined properties for the constraint interface.

Once a constraint interface has been created, the component may be placed based on the properties of the constraint interface. The user may elect to place a new part that contains a constraint interface or may elect to connect two already displayed parts that have constraint interfaces. A part with a constraint interface may be mated with another part having a constraint interface identically configured (i.e., a matching constraint interface). Further, when placing a new part into an assembly that already contains a part with a constraint interface, the invention may automatically place the part based on the constraint interface's settings without any additional user interaction. Additionally, if multiple matching constraint interfaces are found, the user is presented with the option of selecting the appropriate constraint interface to use.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Constraint interfaces provide the ability to mate two components to each other. The constraint interfaces may be predefined when a part is created and may persist with the part for future use such as in a catalog of components. Dialog windows and glyphs assist the user in editing and viewing constraint interfaces and their settings.

Hardware Environment

Figure 1:
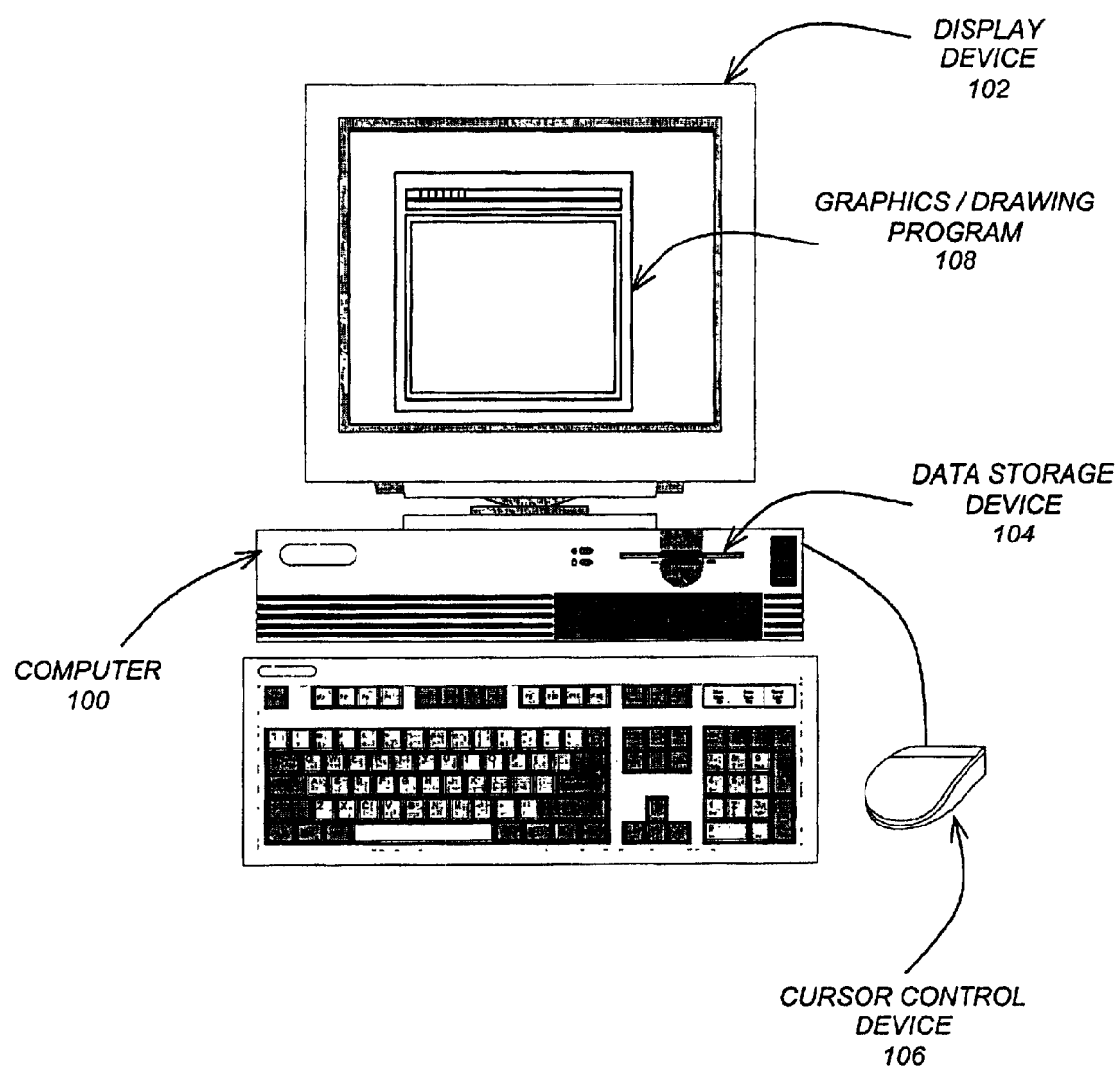
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Software Embodiments

Graphics/drawing program 108 is configured to create, view, and modify drawings (as set forth in the background) displayed on display device 102 in 2D and/or 3D. Such drawings comprise one or more graphical elements. A graphical element may comprise a part or a component. A part or a component may comprise any 2D or 3D geometrical shape or entity that may or may not represent a real-world item such as a washer, bolt, cylinder, cube, nozzle, etc. Each graphical element is made up of one or more features that provide characteristics for the graphical element. For example, a cylinder with a hole may have a cylinder feature and a hole feature.

One or more embodiments of the invention provide the ability to identify features or sets of features within a part or component. Thereafter, a user may define how one part will ultimately be assembled with the assembly for which it was designed. Allowing such predefining results in increased efficiencies in placement and replacement of assembly components. To define how the parts will be assembled, the user specifies settings for an interface (also referred to as a constraint interface) that constrains the part's interaction with another part.

Different types of interfaces may be referred to throughout this document. As used herein, a component interface refers to a named collection of component/part data, that may be interactively (or programmatically) defined by the user including (but not necessarily limited to): feature topology, attribute and property values, variable and parameter declarations and graphical symbolic glyphs that will be used in the placement and replacement of components within assembly models.

An atomic interface is an interface definition consisting of a single feature/constraint pairing. A composite interface is an interface definition consisting of multiple atomic definitions.

A placement half is the portion of an atomic or composite interface definition that exists on the component being. Similarly, the receiving half is the portion of an atomic or composite interface definition that exists within an assembly into which a component is being placed.

Interface Creation

An interface model may be created that allows a user to both place and replace components in an assembly model more efficiently. Interfaces may be created in various contexts (e.g., a part modeling context or an assembly modeling context).

Figure 2:
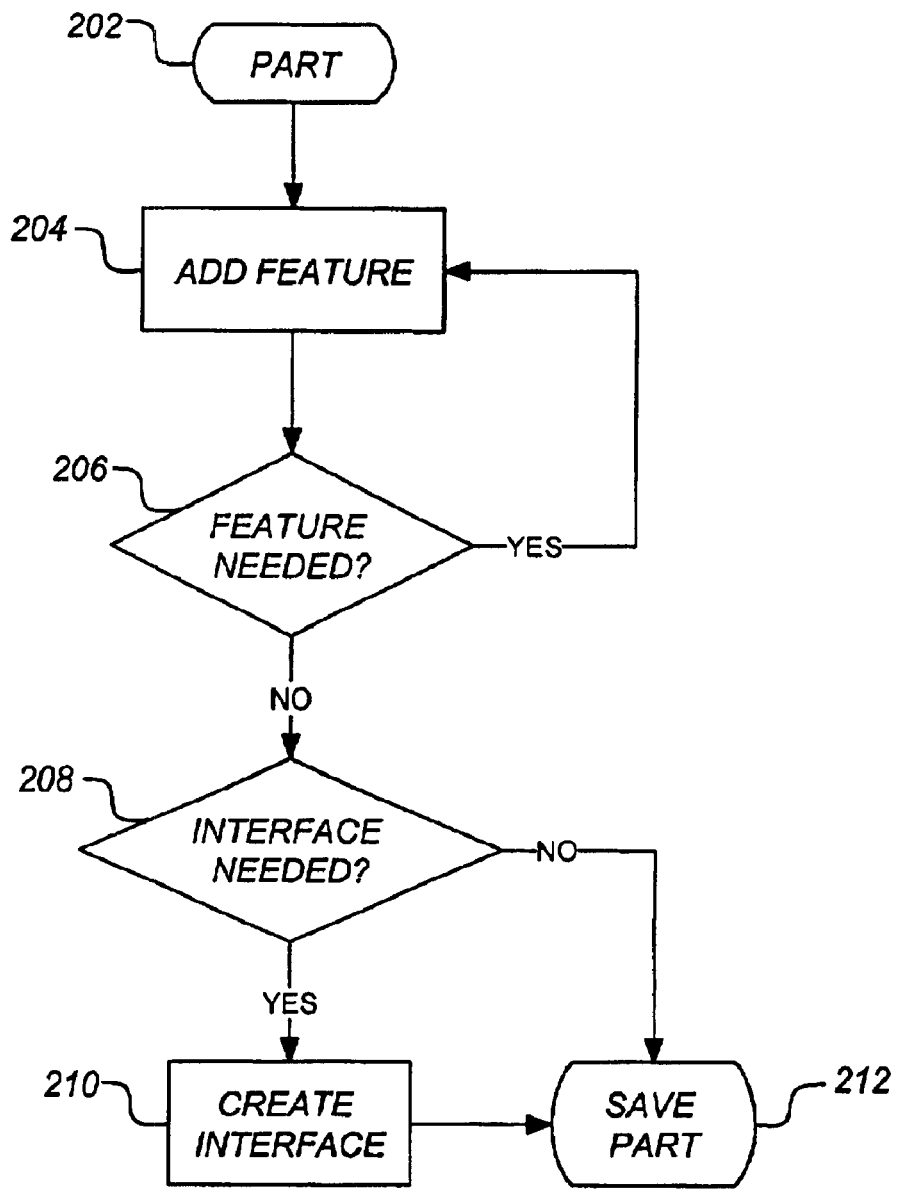
FIG. 2 is a flow chart illustrating the creation of an interface in a part modeling context in accordance with one or more embodiments of the invention.

FIG. 2 is a flow chart illustrating the creation of an interface in a part modeling context. At step 202, the user elects to create a part. At step 204, the user elects to add a feature to the part. At step 206, a determination is made regarding whether another feature is needed. If a new feature is needed, the process returns to step 204. If no further feature is needed, a determination is made as to whether an interface is needed. If an interface is needed, the interface is created at step 210. Subsequent to creating the interface, the part is saved and the process is complete at step 212. Similarly, if an interface is not needed, the process is complete at step 212.

Functionality for creating interfaces may be available in both a part and assembly model environment. An interface may be created similar to the creation of a feature within a part. Within an assembly model environment, creation of the interface may behave exactly the same, thereby allowing an assembly to subsequently be placed using a defined interface.

Interfaces may be created in a variety of manners and may be either atomic or composite. For example, a variety of graphical user interface capabilities such as menus, buttons, and/or a wizard may be used to create an atomic or composite interface. For example, a context menu available by right clicking a mouse button, a command button on a toolbar, or an option on a pull-down menu (e.g., a "Tools" menu) may be used to create an interface. Additionally, a programmatic application programming interface may be defined that allows users to create interface definitions via Visual Basic for Applications™.

Examples of commands that may be available and invoked through a context menu include "Place Constraint", "Replace Component" and "Place Component". The first three commands are used in the initial creation of an interface or placement/replacement of a component in an assembly.

Figure 3:
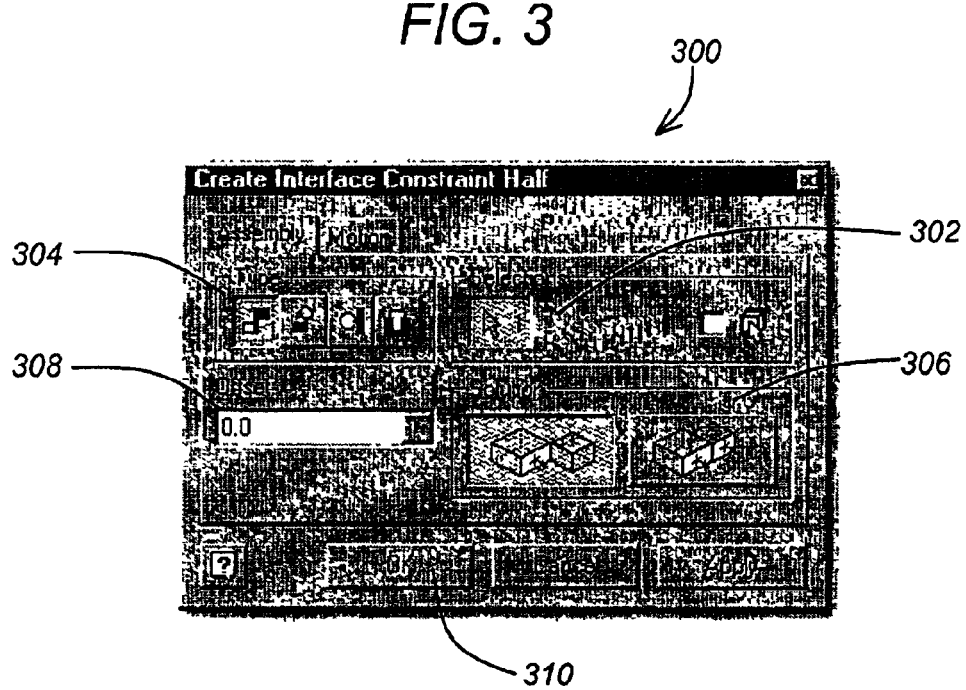
FIG. 3 illustrates a dialog window for defining settings for an atomic constraint interface in accordance with one or more embodiments of the invention.

Using a graphical user interface such as a context menu selection, a user first initiates the creation of an interface. In response, a dialog window may be displayed that permits the user to define settings for the constraints. FIG. 3 illustrates a dialog window for defining settings for an atomic constraint interface in accordance with one or more embodiments of the invention. Once dialog window 300 is displayed, the user is prompted to pick geometry to constrain in an interface. Once a geometry has been selected, the "OK" button 310 is enabled allowing the user to accept the selection and create an atomic interface.

The ability to select a geometry may be indicated by the depression of arrow button 302. Such a button 302 may have a picture of a cursor as illustrated followed by a number that indicates the number for the geometry being selected. Selecting the geometry identifies the geometry on the part to constrain to a mate on another part.

While in the dialog 300, the user may select/edit any of the choices for type 304, solution 306, and or offset 308.

As displayed, atomic constraint interface objects may have one or more properties exposed to the user. Such properties may (or may not) be defined using dialog window 300.

One such property is a rank property. A rank property may have a value such as primary or secondary. The first atomic interface created defaults to a primary rank. A component can only have a single interface with a primary rank. Additionally, there can be an unlimited number of defined interfaces with a secondary rank. Atomic interfaces added to a component following the first shall by default be defined as secondary. Users may be allowed to manually promote any secondary interface to the primary position. The program may enforce the single primary rule by automatically demoting the current primary to a secondary whenever a new primary interface is identified. Upon creation of the first composite interface (within a component), the composite shall inherit the primary tank and the former primary atomic interface is "demoted" to a secondary rank. The primary interface is the interface used when a component is being placed.

Each interface may also have a type 304 property. The type 304 property of a constraint interface may be one of the following: mate, flush, angle, tangent, insert, rotation-rotation, rotation-translation or translation-translation. A mate constraint specifies that the selected face, edge or point will be positioned to co-locate with another face, edge or point on a component with a matching mate. A flush constraint specifies that the selected face, edge or point will be positioned face to face with another face on a component with a matching mate. An angle constraint specifies the allowed angle of the selected edge, axis or planar face when positioned relative to another component with a matching mate. It should be noted that with an angle constraint, a matching mate does not need to be identically configured for the mating to occur. A tangent constraint requires contact of the selected face, plane, cylinder, sphere, cone or edge at a tangent point on a component with a matching mate. An insert constraint requires a circle-to-circle mate constraint between a circular edge and a mate constraint between axes on a component with a matching mate. A rotation-rotation constraint specifies how much a given component will rotate about a specified axis for every rotation of another given component about a specified axis. A rotation-translation constraint specifies how much a given component will translate (or move) in a specified direction for every rotation of another given component about a specified axis. A translation-translation constraint specifies how much a given component will translate (or move) in a specified direction when another given component is translated in a specified direction.

Each of the types 304 that are available may be represented graphically on an icon on the face of a button. Thus, graphic representation reflects the type 304 of constraint interface that is being selected. Once a type 304 has been selected, when the cursor is moved over the drawing, only certain features of the drawing may change colors to reflect that the feature is of the selected type.

Each constraint interface may also have a "solution" 306 property. The solution 306 property shows the relationship defined when a part is constrained to a matching mate in an assembly. Available solution 306 settings may include mate/flush, flip1/flip2, inside/outside, and aligned/opposed. However, the solutions available vary and change depending on the type 304 selected. Thus as illustrated in FIG. 3, when the type 304 is "mate", only the mate and flush solutions 306 may be displayed and available. Similar to the type 304 setting, the solution 306 settings may be graphically represented on an icon on top of a selectable button. The graphical representation illustrates how the interface will operate if the solution is selected.

A numerical parameter 308 may also be set for each constraint interface. Depending on the constraint type, this numerical parameter can be one of the following: offset, angle, ratio, distance. The offset value specifies a distance—by which the mate halves are offset from one another. For example, by entering "1 in" in the offset field 308, when the interface is applied to a part, the parts are mated with a distance of 1 inch in accordance with the other settings. An angle value specifies the angle by which the mate halves are to be held. The ratio specifies how much a given component will rotate or translate when another given component rotates or translates. A distance value specifies how much a given component will translate when another given component is rotated.

Each constraint interface may also be identified by a name. A default name may indicate which constraint was used in defining the interface. Such a default name may be proceeded by a single character (e.g., "i") and followed by a number. For example, a part that has two mates and a flush constraint defined would show the following: iMate1, iMate2, and iFlush1. The user may optionally rename interfaces. By selecting an unconsumed interface definition, the user can redefine a name by selecting a "Rename" option on a context menu or by clicking in a text node.

Another property reflects whether the constraint interface is suppressed or unsuppressed (i.e., whether the constraint interface may be currently active in the display window or temporarily suppressed).

Composite interfaces may have similar properties such as name, status (suppressed/unsuppressed), rank (primary, secondary, tertiary), or members (atomic1, atomic2, . . . , atomic "n"). The members listed in a composite interface identify the atomic constraints that comprise the composite interface.

Figure 4:
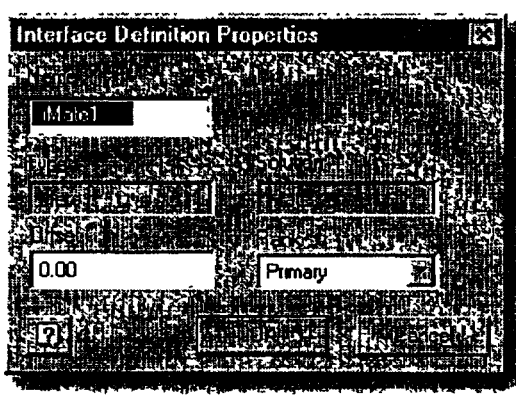
FIG. 4 illustrates an interface properties dialog that may be used to select and view properties of a constraint interface in accordance with one or more embodiments of the invention.

Interface properties may be accessible from the dialog illustrated in FIG. 3. Additional properties may be accessible from an interface properties dialog that may be invoked via a context menu selection. What can be modified may depend on where the interface is selected. FIG. 4 illustrates an interface properties dialog that may be used to select and view properties of an interface. When selected in certain modes (e.g., in the defining component mode), users may not have access to the suppressed properties. However, in the proper usage scenario, users may see the values defined in the definition and will have access to the suppress property.

Once an interface is created, an interface folder may be added to a component browser window. A browser window shows the structure of parts, assemblies, and drawings in an active file that is displayed in a display window. Elements are listed hierarchically with a "+" indicating than the view of that element may be expanded and includes children (elements lower in the hierarchy). A "−" indicates that the element is fully expanded and all children are currently displayed. An interface folder displayed in the browser window contains the interface object. The folder will contain as many constraint interface entries as are defined for the component. If a constraint interface is a composite constraint interface then it in turn will also be expandable to reveal its member constraint interfaces.

Following the creation of an interface, an interface glyph may be displayed within the model. This interface glyph may also be displayed in the browser window. Further, once created, users may edit the definition of an interface. The interface definition is owned by the component and will be displayed in the component's interface folder. When this node is selected in the browser window, the user may be able to redefine the interface's constraint definition by selecting an "edit" option from a context menu. In response, the dialog window 300 of FIG. 3 may be displayed and used to edit the settings/properties.

Interface Representation

Figure 5:
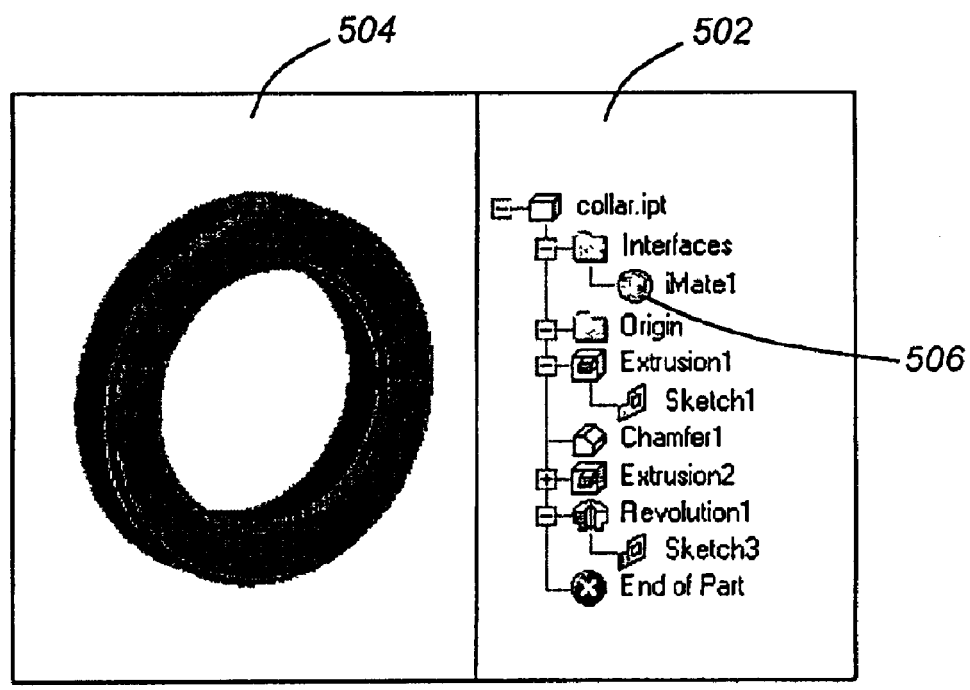
FIG. 5 illustrates a browser window and display window in accordance with one or more embodiments of the invention.

As briefly alluded to above, interfaces may be represented symbolically in both a browser window and graphic display window. FIG. 5 illustrates the different windows in accordance with one or more embodiments of the invention. The browser window 502 shows the structure of parts, assemblies, and drawings in an active file that is displayed in a display window 504. Similar to the selection of other objects in a drawing program, selecting an interface in one location (graphics 504/browser 502) should cross-highlight in the other location. Additionally, an interface may be found using a "find" operation.

Component interfaces can be created on both part models and assembly models and when they exist, they shall be collected into a browser 502 folder. If no component interface has been defined, no interface folder will exist in the part browser 502. If no component interface has been defined within a part file, an "Interface Glyphs" visibility toggle may not be enabled. As soon as a component interface has been defined within a part file, the "Interface Glyphs" visibility toggle becomes enabled and may be checked. Further, with a component interface defined within a part file, the status of the "Interface Glyphs" visibility toggle may be persisted within the part file. Also, if in assembly mode, the visibility toggle may be persisted per user.

Graphic glyphs may be optionally displayed in the display window 504 to remind a user that an interface object has been created/placed. These glyphs may be identical to the icons displayed in a browser window 502. The interface glyph is illustrated in browser window as glyph 506.

Figure 6:
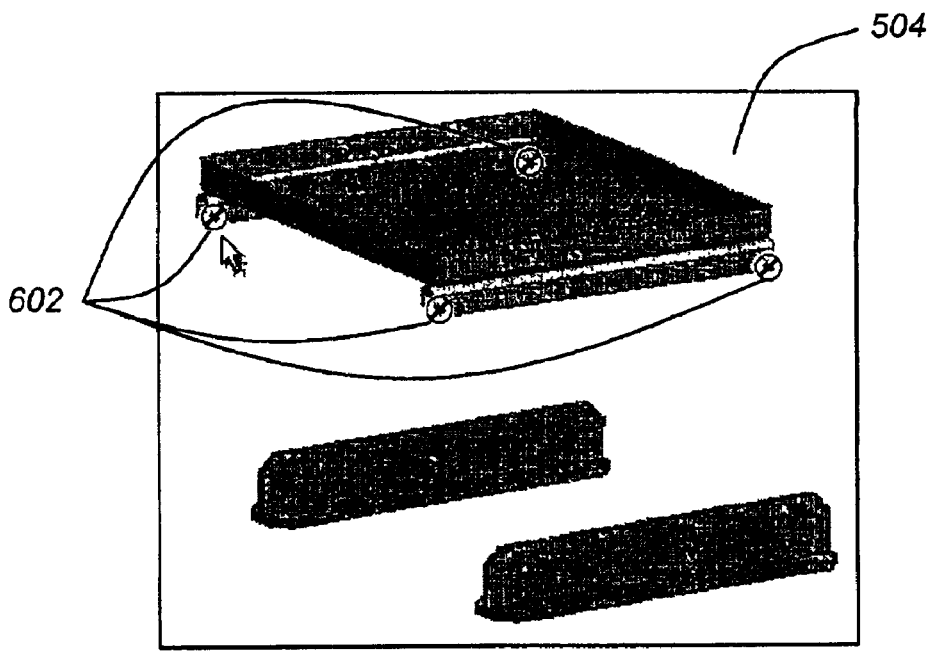
FIG. 6 illustrates four separate composite glyphs placed within an assembly model in accordance with one or more embodiments of the invention.

The glyph 506 in FIG. 5 illustrate a glyph for an atomic interface (referred to as an atomic glyph). As additional atomic interfaces are created, further atomic glyph 506 is appropriately placed and graphically depicts the type and solution for the interface. However, the glyph may change if a composite glyph is created. Since a composite interface defines a collection of atomic interfaces, a single/symbolic glyph may be used to graphically represent the object within the graphic view of the model. FIG. 6 illustrates four separate composite glyphs placed within an assembly model. Each separate composite glyph 602 represents one or more member constraint interfaces. The location of the composite glyph is determined by using the location of one of its member constraint interface glyphs. Constraint interfaces that are members of a composite are not displayed.

Figure 7:
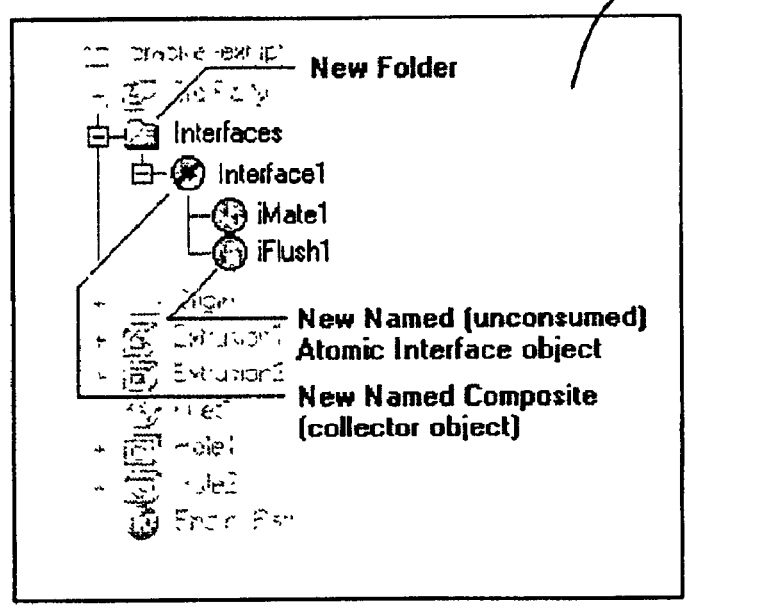
FIG. 7 illustrates a browser window with a composite constraint interface and two member atomic constraint interfaces in accordance with one or more embodiments of the invention.

Component interfaces may be represented both within the part and assembly browsers 502. Within the part environment, following the creation of an interface, the interface is grouped like origin work features or third-part assertions. FIG. 7 illustrates a browser window 502 with a composite interface and two member atomic interfaces.

Figure 8:
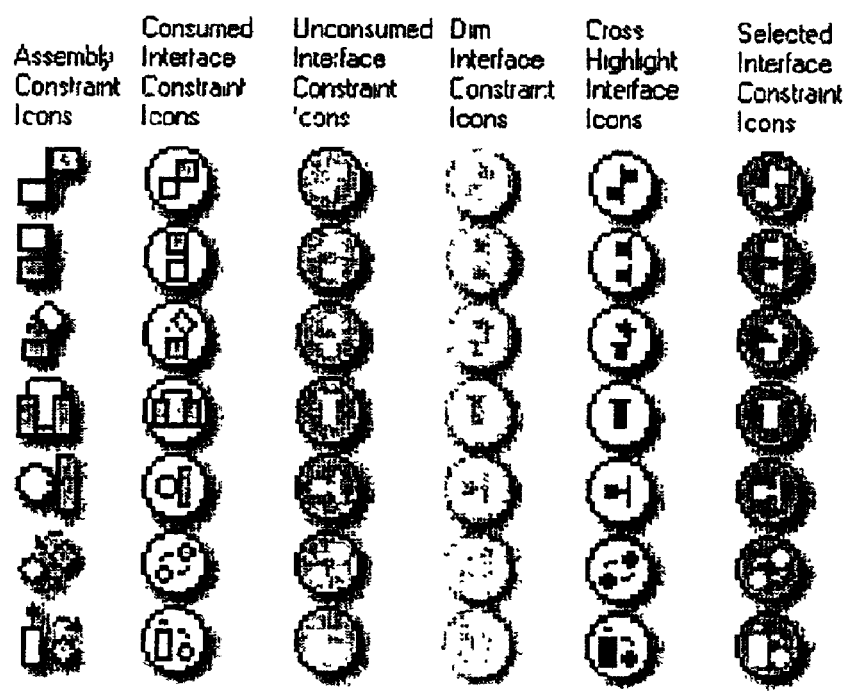
FIG. 8 illustrates some of the different types of interface glyphs that may be displayed in accordance with one or more embodiments of the invention.

FIG. 8 illustrates some of the different types of interface glyphs that may be displayed in accordance with one or more embodiments of the invention. The different illustrated glyphs may be displayed on a display device in different colors to more easily distinguish them.

Thus, a single base shape may be represented in various ways depending on various settings. Each row of FIG. 8 represents glyphs having different base shapes. Accordingly, the same base shape (or a glyph with the same general shape and thus similar settings [e.g., type and solution]) is displayed in a single row with each glyph in the row (i.e., each column) comprising a variation of the shape.

Each column represents the glyph to be displayed depending on the current use. The first column illustrates the general shape of a glyph/icon to be displayed. When the interface is consumed (i.e., mated with another interface), the glyph in the second column is displayed. When unconsumed (i.e., an interface that is not mated) the glyph in the third column is displayed. The glyphs in the fourth column are displayed when the glyphs cannot be selected. The glyphs in the fifth column are displayed when the user selects the corresponding interface in either the browser window 502 or display window 504. The last column of glyphs is displayed when a particular interface is selected.

The assembly browser window 502 provides users with two principal viewing "schemes" called assembly tasks and modeling tasks. Assumptions may be made regarding what the user is doing in each of these "modes" and the browser window 502 may be modified accordingly.

In the assembly tasks viewing mode, the assumption is that the user is primarily doing things at the assembly level and therefore is concerned about the assembly objects: components and constraints. Specific constraints are shown as children of the components to which they have been placed. These constraints will therefore be represented twice (once under each component).

In the modeling tasks viewing mode, the assumption is that the user is doing things (or planning to do things) at the part feature level and therefore is concerned about the feature structure of the placed components. All of the constraints for the specific assembly are collected into a constraint folder. Constraints will therefore only be shown once.

Since the actual component object is the owner of the interface definition, an assembly may represent two types of interfaces: unconsumed interface halves which will be used to place the assembly when it is used as a component, and consumed interface pairings which position children components. When the assembly browser 502 is in assembly tasks mode, the consumed interfaces may be displayed just like constraints. The consumed interface browser icon is represented as a colored constraint within a circle "wrapper". The interface glyph is displayed under the component the interface places/positions—meaning two glyphs will be displayed.

Deleting an interface in assembly tasks mode is equivalent to deleting a constraint. Accordingly, deleting an interface may be thought of as disconnecting the constraint interfaces. However, the definition of the interface is still defined within the component models and can subsequently be re-used.

When the assembly browser 502 is in modeling tasks mode, the consumed interfaces may be collected into an interface folder. In this mode the interface folder will display any unconsumed interfaces which will be used later as well as a single node for each interface which pairs two components. Since the "unconsumed" definition of the interface is a sibling of the part feature, the unconsumed interface shall be displayed within the interfaces folder of the individual component. The unconsumed interface browser icon may be represented as a gray filled version of the consumed interface.

Figure 9A:
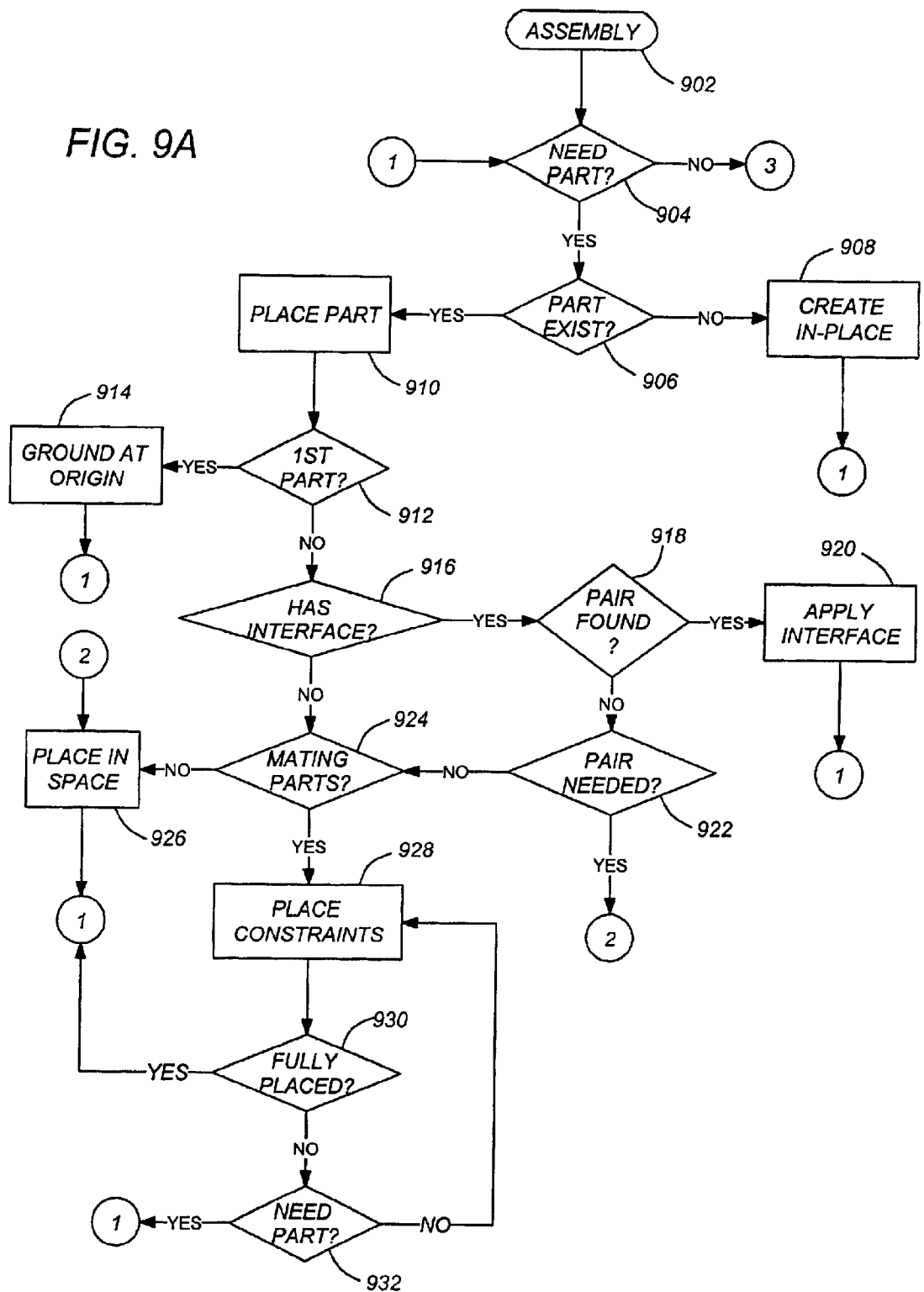
FIGS. 9A–9B are flow charts illustrating the use of a constraint interface in accordance with one or more embodiments of the invention.
Figure 9B:
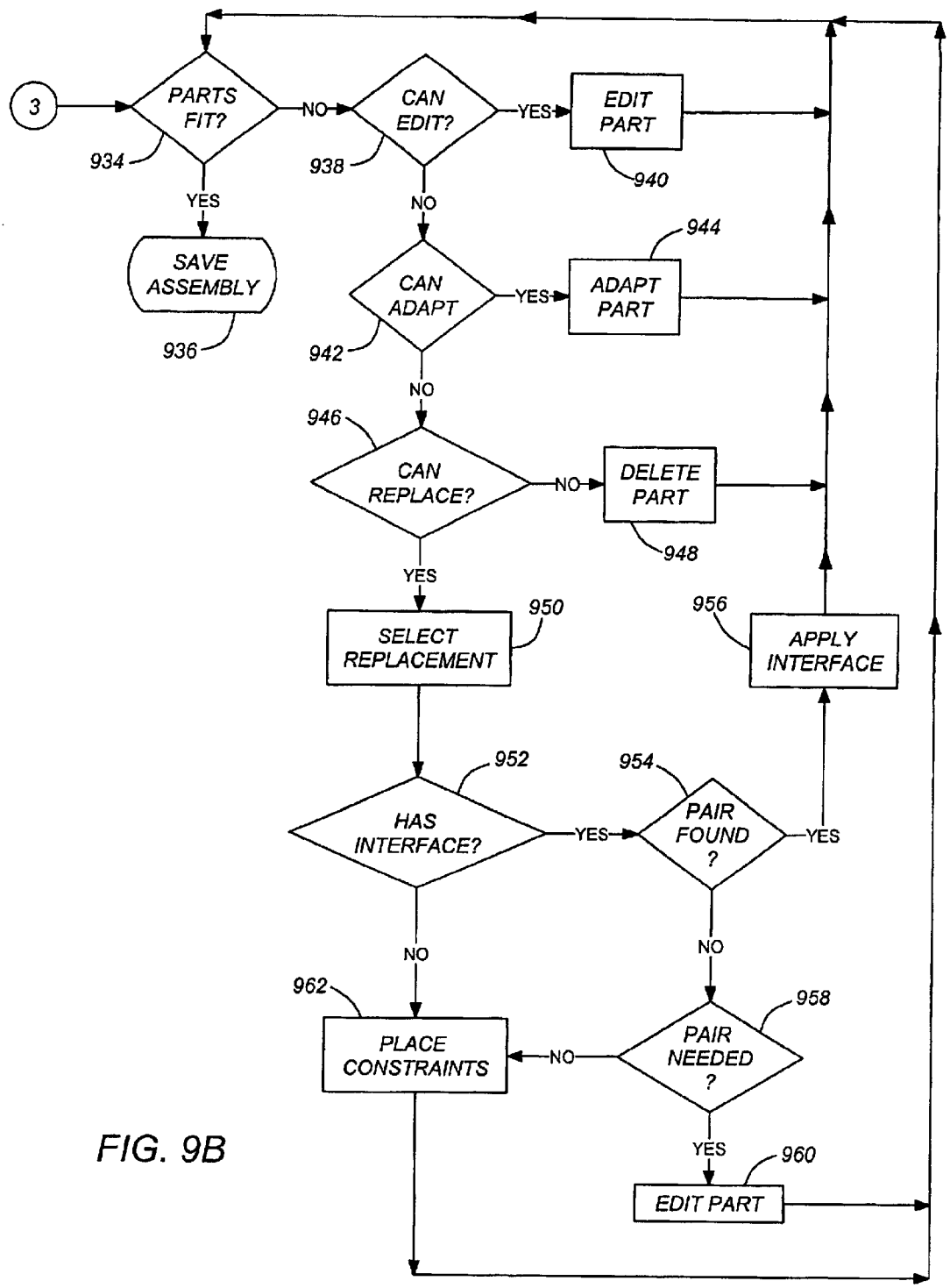

Deleting in this manner completely eliminates the interface definition and marks any previously connected interface couplings with the deleted interface inconsistent Interface Use Once an interface has been created, the interface may be used in a variety of manners. FIGS. 9A–9B are flow charts illustrating the use of an interface in accordance with one or more embodiments of the invention. At step 902, the user is in an assembly mode and is creating an assembly. At step 904, a determination is made regarding whether a part is needed for the assembly. If a part is not needed, processing continues in FIG. 9B. If a part is needed, a determination is made if the part exists at step 906. If the part does not exist, the part is created in place at step 908 and processing continues at step 904.

If the part already exists, the part is placed at step 910. A determination is made at step 912 if the placed part is the first placed part. If the part is the first part, the part is grounded at the origin at step 914 and processing continues at step 904. If the part is not the first part, a determination is made at step 916 regarding whether the part has an interface. If the part has an interface, a determination is made as to whether a matching interface (i.e., a pair) is found at step 918. If a pair is found, the interface is applied at step 920 for placement of the part and processing continues at step 904. Thus, the user merely needs to select a part with an interface, and if a matching interface/pair is found when the part is selected, the part is automatically placed in accordance with the match.

If a pair is not found at step 918, a determination is made at step 922 regarding whether a pair is needed. If a pair is not needed, a determination is made at step 924 regarding whether parts are being mated. This determination is also made if the part does not have an interface (via step 916). If parts are not being mated, the part is placed in space at step 926. Similarly, if it is determined that a pair is needed, the part is placed in space at step 926.

If, at step 924, it is determined that the parts are being mated, constraints are placed on the parts at step 928. At step 930, a determination is made regarding whether the part has been fully placed. If the part has been fully placed, processing continues at step 904. If the part is not fully placed, a determination is made regarding whether another part is needed at step 932. If another part is needed, processing continues at step 904. However, if another part is not needed, additional constraints are placed as the processing continues at step 928.

FIG. 9B provides for the processing when a part is not needed pursuant to the determination at step 904. At step 934, a determination is made regarding whether the parts fit. If the parts fit, the assembly is saved at step 936. If the parts do not fit, a determination is made regarding whether one or both of the parts can be edited at step 938. If a part can be edited, the part is edited at step 940 and processing continues at step 934. If the part cannot be edited, a determination is made regarding whether a part can be adapted to the existing assembly at step 942. If the part can be adapted, the part is adapted at step 944 and processing continues at step 934.

If the part cannot be adapted, a determination is made regarding whether the part can be replaced at step 946. If the part cannot be replaced (and cannot be adapted), then the part is deleted at step 948 and processing continues at step 934. However, if the part can be replaced, the part is replaced at step 950. At step 952, a determination is made regarding whether the replaced part has an interface. If the replaced part has an interface, a determination is made at step 954 regarding whether a matching interface (i.e., a pair) is found. If a pair is found, the interface is applied at step 956 in order to place the parts, and processing continues at step 934.

If a pair is not found, a determination is made regarding whether a pair is needed at step 958. If a pair is needed, the part is edited at step 960 in order to create the pair and place the parts where processing continues at step 934. If a pair is not needed, additional constraints may be placed at step 962, and processing continues at step 934. Similarly, if the replacement part does not have an interface, constraints on the replacement part may be made at step 962.

As illustrated in FIGS. 9A–9B, a user elects to place a part and if it is the first part, it is merely placed in the display area and grounded at an origin. Thereafter, if the part being placed has an interface and the interface matches an interface of a part already placed, the interface is applied and the part is placed in accordance with the interfaces. If the part does not have an interface, the part may be placed normally and mated to another part using defined constraints.

As described above, various commands may be used to create and use a component constraint interface (e.g., Place Constraint, Replace Component and Place Component). The following descriptions illustrate details of one or more of these commands.

The "Place Constraint" command may be used to place a constraint on an part/component that matches an already existing interface. Once the command is initialized the user may have the ability to select a displayed glyph in a display window. An interface may be selectable based upon the defined constraint type 304 (e.g., only those interfaces or features that comply with the identified type 304 can be selected). For example, a mate interface may be selected while the constraint type 304 is set to mate.

Figure 10A:
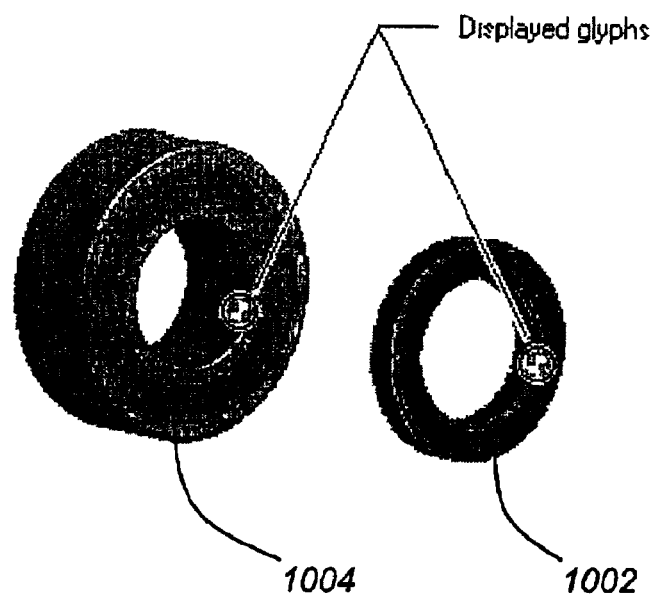
FIGS. 10A–10E illustrate the use of two component constraint interface definitions via an assembly constraint interface consumption method in accordance with one or more embodiments of the invention.
Figure 10B:
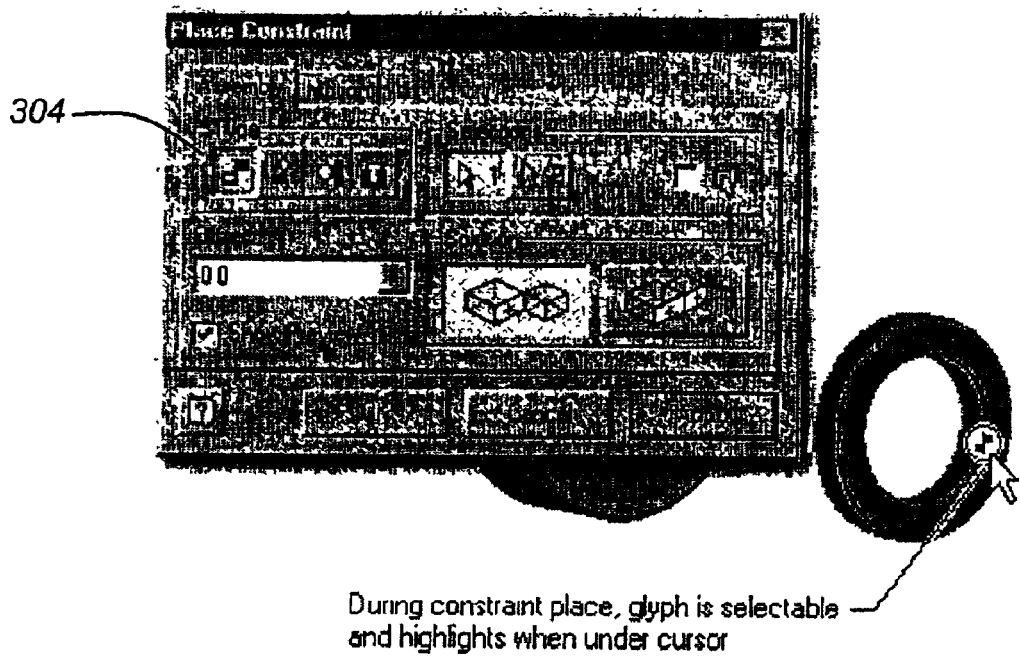

Having selected an interface, the user may be able to select (or drag) using logic that allows the selection of valid matching topology/geometry as well as like-typed interfaces. Accordingly, this allows the user to place a pre-defined interface to a component without an interface definition. FIGS. 10A–10E illustrate the use of two component interface definitions via an assembly constraint consumption method. Referring to FIG. 10A, in the example, assume that there is an axial mate interface defined on the collar 1002 and on the bearing race 1004.

Figure 10C:
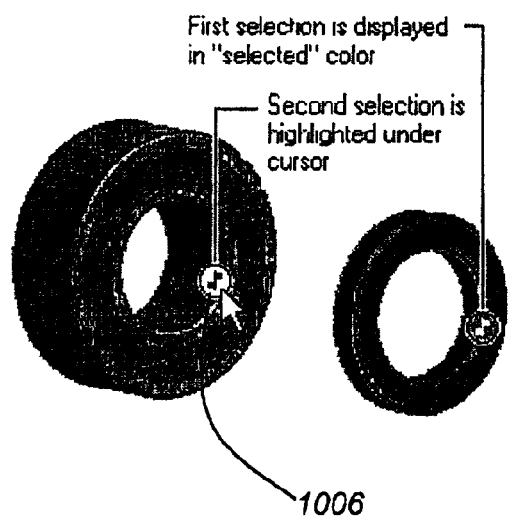

Within the assembly environment, the interface glyphs are displayed as illustrated. The user may then select the "Place Constraint" command and the dialog of FIG. 10B appears. With the constraint type 304 set to "Mate", the axial mate interface glyphs are located via a filter of the invention and will highlight. As illustrated in FIG. 10C, once a user selects an interface glyph on collar 1002, the glyph displays selected. The user is then in a second selection state of the constraint placement command and only valid selections are selectable. In this example, axes, linear edges, or valid interfaces may highlight (and select).

Figure 10D:
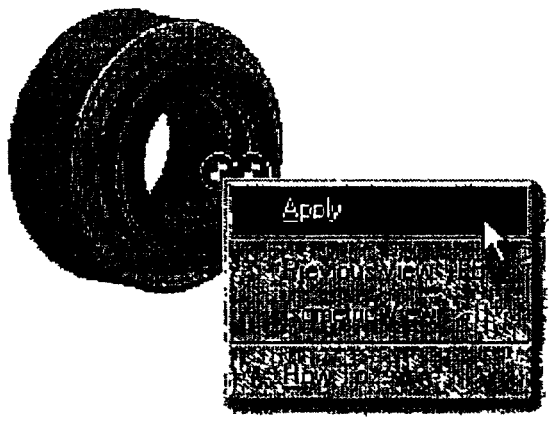
Figure 10E:
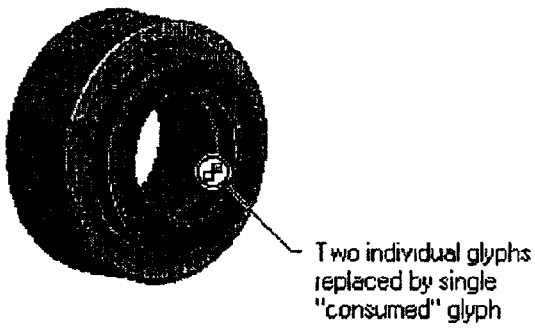

Assuming that a user has enabled the ability to preview constraints, once a second interface glyph is selected (e.g., glyph 1006), the under constrained collar 1002 will move to the preview position as illustrated in FIG. 10D. Thereafter, the user may be required to "Apply" the interface pairing (similar to other constraints). Once applied, the two previously separate interface glyphs will disappear from the display window.

Another command used to place constraints is "Replace Component". The use of interfaces during a component replacement may be transparent to users. If a component was connected using an interface and is subsequently selected for replacement, as long as the replacement component has the same interface definition the replace deletes the initial component, replaces it with the selected component, and reattaches the interface. During the replace process, if the system detects a missing interface definition, a warning dialog may be displayed.

An additional command that is commonly used and briefly described above is "Component Place". With this command, the user is electing to place a component into an assembly where the component being placed contains an interface definition. Once the command is selected, a dialog window allows the user to select the component to place. As described above, a "User Interface" checkbox may be present in the dialog window. The checkbox may default to being checked if the selected component has an interface and may be dimmed if the selected component does not contain an interface definition.

If the checkbox is checked, the invention determines if one or more matching interfaces is already displayed in the display window. If one or more matches are found, the part is automatically placed based on the settings/properties of the constraint(s).

In addition to connecting interfaces, the user may be provided with the ability to disconnect interfaces (without deleting the interface object itself). To provide such capabilities, a context menu (available by double clicking or right clicking a selected consumed interface) may provide a "Delete" command. When a consumed interface is deleted in this manner, the interface will be disconnected but won't be deleted.

Specific Workflow Examples

The following examples illustrate specific examples of the use of constraint interfaces in accordance with one or more embodiments of the invention.

An individual, one-seat designer doing primarily custom/one-off designs may use component interfaces that are built into components that can be obtained via supplied catalogs of pre-built components. Alternatively, such a user may use, component interfaces for frequently used components that may have been obtained from a vendor's web site. For most of such a user's designs, placement of components using component interfaces would be used to easily and efficiently place a "receiving half" of an part.

Many companies design derivative machinery—machinery that re-uses a high percentage of internally designed subassemblies or specific component parts. A member of a corporate design team with an internal engineering mandate to reuse as much as possible may utilize the ability to pre-define component interfaces to facilitate subsequent ease of assembly and replacement of like components in design iteration.

Some companies staff their engineering departments with individuals responsible for supporting CAD software installation. An engineering support designer responsible for generating component parts for internal consumption by his company's team of designers may be responsible for productivity macros, programs, etc. Such a designer pre-define component interfaces that will facilitate subsequent ease of assembly and replacement of like components in design iteration. Thereafter, the re-use advantage may be passed on to the ultimate consumer of the model.

A product designer at a company that manufactures component parts sold via catalog often works on families of parts/assemblies. Very often these components utilize common components. Such a designer may pre-define component interfaces that will facilitate subsequent ease of assembly and replacement of like components in design iteration.

A user at a company may be responsible for manufacturing catalog parts and for generating the CAD models to supply to engineers who use their component parts. Often these individuals may be the same people who are responsible for creating the actual designs used to manufacture the components. Further such individuals may have the task of generating a lighter weight model for customer use. Such individual designers typically work on families of parts/assemblies. Since the resulting component models are targeted at customer CAD users, a significant advantage may be provided by having the component interface built into the model.

A user is interacting with related application that outputs models containing a defined interface. The end user in this case may not be using an original application that fully incorporates this technology. Instead, the end user may be using (an as yet undefined $3^{rd}$-party application) that directly interacts with original application components and in the process, creates a defined interface.

A user may also create a part within the part modeling environment, add an atomic interface definition to the part, and save the part. Thereafter, the user creates a second part also containing the same interface definition. The user then creates an assembly and places the first part into the assembly. With the "Use interface" checkbox selected, the user places the second part into the assembly. During placement, the system determines that the interface definition of the part being placed matches an unconsumed interface existing in the assembly and the part is placed such that the constraint interface is applied. Further, since the "Use Interface" checkbox was selected, the "Place Component" command terminates with a single placement and interface attachment of the selected component.

Alternatively, a user may create a part within the part modeling environment, add an atomic interface definition to the part, and saves the part. Thereafter, the user creates an assembly and places the part into the assembly. The user in-place creates a new part within the assembly in which they define an interface. The user returns to the assembly level edit environment and invokes a "Place Constraint" command. During the constraint placement the user selects the displayed glyph of one of the unconsumed interfaces. The invention then only allows matching unconsumed interface selections or geometry valid selections that would satisfy the previously selected interface half.

Figure 11A:
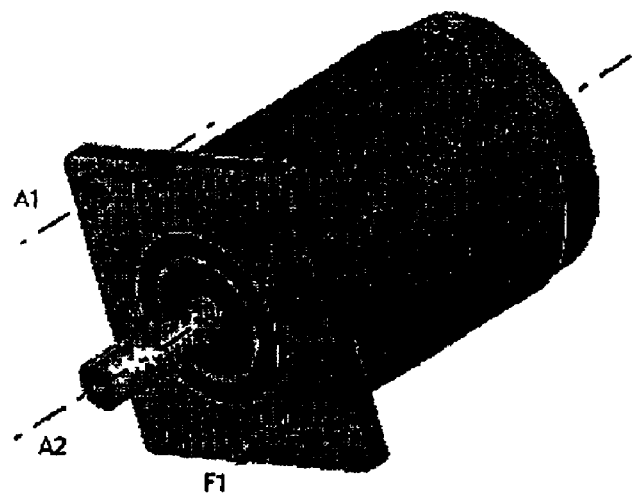
FIGS. 11A–11B illustrate two component constraint interface halves in accordance with one or more embodiments of the invention.
Figure 11B:
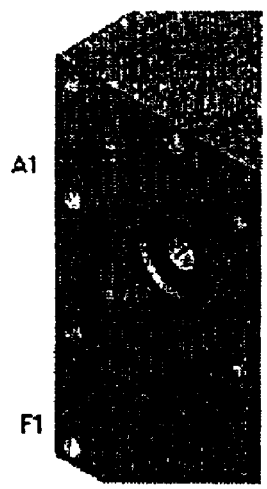

In another example, a user is designing a piece of machinery and plans to utilize a stepping motor in the design. The user visits a supplier web page to obtain component data. The user finds that the supplier has the components already modeled in an appropriate format for download. The selected model contains a predefined (composite) component interface that will completely position the model within the user's assembly. As illustrated in FIG. 11A, the component will be completely positioned using two axial mates A1 and A2 and one face mate F1. The corresponding interface features appear as illustrated in FIG. 11B.

Similar to many industrial components, the particular device of FIG. 11A comes in a number of sizes and models, all of which may be detailed via a table of dimensional values in a vendor's catalog:

TABLE 1

| Model # | Shaft Dia. | Boss Dia. | Mtg. Dia. | Mtg. Hole |
|---|---|---|---|---|
| S2101 | 0.500 | 1.250 | 3.200 | 0.250 |
| S2105 | 0.625 | 1.375 | 3.375 | 0.313 |

As seen in Table 1 (i.e., the portion of the vendor's catalog table), model #S2101 is similar to model #S2105. The user selects model #S2101 and stores the model in their workspace. Additionally, the user downloads a feature (referred to as a DesE1 feature) that contains the other half of the interface that allows the user to place all of the needed features onto the receiving part(s). The DesE1 feature may be stored in catalog of DesE1 features maintained by the user.

A1, A2, and F1 as shown in FIG. 11A are collected as named objects into a named composite interface object called "stepper_mount". This composite object contains enough information to fully position the component when it is paired, with its corresponding interface object: "stepper_mount" that contains named objects A1', A2', and F1' and that was previously placed on some other component.

To user then invokes the "Place Component" command and selects the "Use Interface" checkbox. The invention then looks for matching interfaces. If only a single match is found, the component is immediately placed. However, if multiple matches are found, the matches are highlighted and the user is prompted to select one of the matching interfaces.

Figure 12:
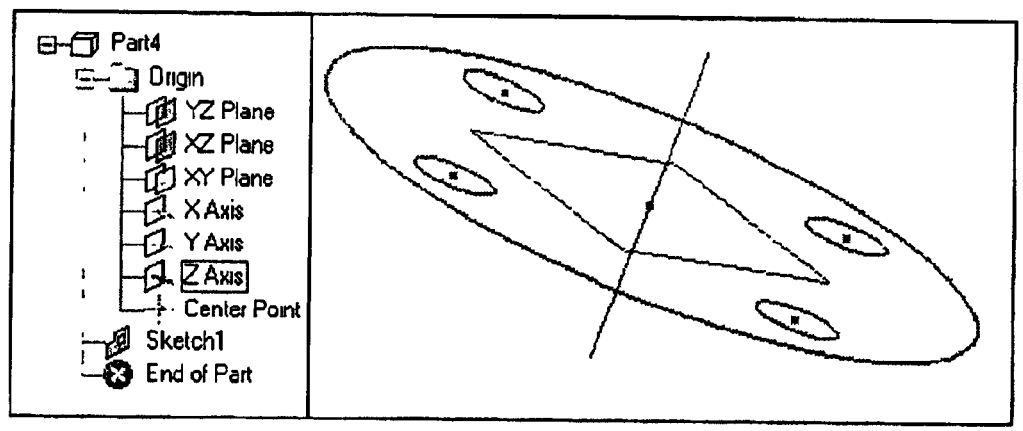
FIG. 12 illustrates an example of a sketch where the user will place constraint interfaces in accordance with one or more embodiments of the invention.

In another example, a part contains only sketch geometry consisting of five circles drawn on the XY origin plane as illustrated in FIG. 12. The use recognizes at this stage of the design that the displayed Z-axis and XY-origin plane will serve as a useful interface for the resulting model and that defining this interface at this point in the design process will facilitate use of this "part model" in the evolving assembly. No solid topology has yet been created. The ability to select sketch geometry and work features in the creation of atomic or composite interfaces is required.

Figure 13:
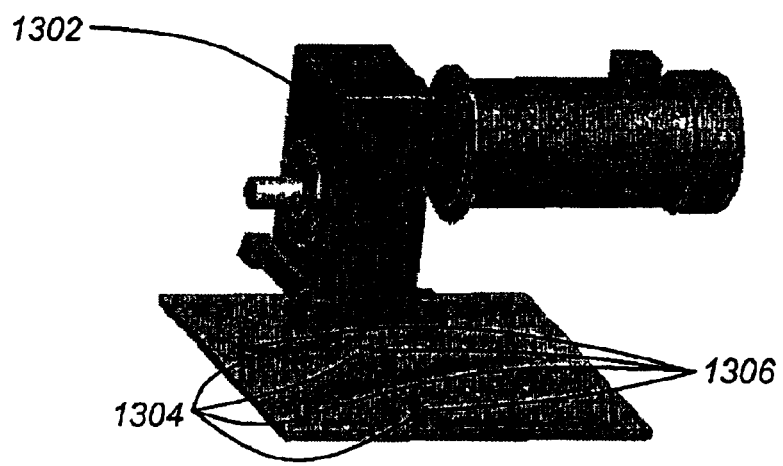
FIG. 13 is an example of a gear motor being placed in accordance with one or more embodiments of the invention.

In a last example illustrated in FIG. 13, a gear motor 1302 is being placed. There are two sets of four holes 1304 and 1306 that define the receiving half of the interface. Either set 1304 or 1306 is valid depending upon the intended configuration of the rest of the assembly relative to the mounting plate. The hole patterns are marked within the interface definition using an equivalence operator that defines either set as satisfying the interface. Upon placement, the user must resolve which set 1304 or 1306 is desired.

Interface Creation Summary

Figure 14:
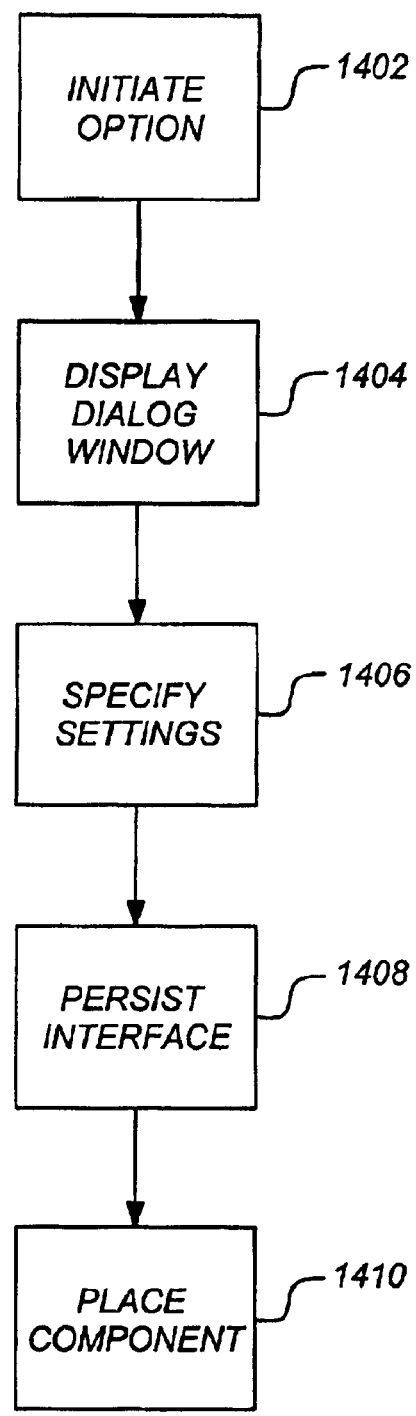
FIG. 14 is a flow chart illustrating the creation and use of a constraint interface in accordance with one or more embodiments of the invention.

As described above, constraint interfaces may be created and used in a variety of formats manners. FIG. 14 is a flow chart illustrating the creation and use of a constraint interface in accordance with one or more embodiments of the invention. At step 1402, an option to create a first constraint interface for a first geometric characteristic of a first component is initiated.

At step 1404, in response to the initiation of step 1402, a dialog window is displayed. The dialog window provides the ability to specify settings in step 1406 for the first constraint interface regardless of whether a second constraint interface is currently displayed. In other words, the interface settings may be specified when a part is created and not merely when a part is being placed in an assembly. The settings define mating properties for how the first geometric characteristic of the first component mates with the second constraint interface.

At step 1408, the first constraint interface of the first geometric characteristic (i.e., feature) is persisted with the first component. In other words, the constraint interface is stored with the component for future use. At step 1410, the component containing the constraint interface is placed. Such a placement may comprise immediately and automatically placing the first component without further user interaction based on the settings of the first constraint interface (e.g., using the "Use Interface" checkbox).

When placed, the first constraint interface and second constraint interface may be required to be identically configured in order to mate with each other. However, although identically configured, they may identify different geometric characteristics. Further, as described above, glyphs may be displayed in either the display window or browser window to indicate the existence, current use, and/or settings of the constraint interfaces.

Various mating properties may be specified for the constraint interfaces. Further, some properties may be dependent on other properties. Properties may include a type, name, solution, and offset.

A constraint interface may be either atomic or composite. An atomic interface is a single constraint interface. A composite interface is a collection of atomic and other composite interfaces.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for defining mating properties of a graphical component in a computer-implemented drawing program, comprising:

initiating an option to create a first constraint interface for a first geometric characteristic of a first component;

in response to the initiation, displaying a dialog window for specifying settings for the first constraint interface regardless of whether a second constraint interface is currently displayed, wherein the settings define mating properties for how the first geometric characteristic of the first component mates with the second constraint interface;

persisting the first constraint interface of the first geometric characteristic with the first component;

displaying a glyph within a browser window, wherein the display of the glyph indicates an existence of the first constraint interface and the glyph graphically represents the settings for the first constraint interface; and modifying the glyph when the first constraint interface is mated with the second constraint interface.

2. A method for defining mating properties of a graphical component in a computer-implemented drawing program comprising:

initiating an option to create a first constraint interface for a first geometric characteristic of a first component;

in response to the initiation, displaying a dialog window for specifying settings for the first constraint interface regardless of whether a second constraint interface is currently displayed, wherein the settings define mating properties for how the first geometric characteristic of the first component mates with the second constraint interface;

persisting the first constraint interface of the first geometric characteristic with the first component;

selecting a command to place the first component in a display window by selecting the first component;

automatically placing the first component in the display window without further user interaction based on the settings of the first constraint interface.

3. The method of claim 2 wherein the automatic placement is enabled through an option that is selectable in a dialog window displayed while the first component is being selected.

4. The method of claim 1 wherein the first constraint interface and second constraint interface each identify a different geometric characteristic but must otherwise be identically configured in order to mate the first component with a second component based on the settings.

5. The method of claim 1, further comprising displaying a glyph located in proximity to the first geometric characteristic in a graphical display of the first geometric characteristic wherein the display of the glyph indicates an existence of the first constraint interface.

6. The method of claim 5, further comprising removing the glyph from display once the first constraint interface is mated with the second constraint interface.

7. The method of claim 5, further comprising modifying the glyph when a cursor is placed over the glyph.

8. The method of claim 1, wherein one or more icons displayed in the dialog window graphically depict a mating property.

9. The method of claim 8, wherein the one or more icons are displayed on one or more selectable buttons in the dialog window.

10. The method of claim 1, wherein the mating properties comprise a type of constraint interface.

11. The method of claim 10, wherein the type of constraint interface is mate, angle, tangent, insert, rotation-rotation, rotation-translation or translation-translation.

12. The method of claim 10, wherein the mating properties further comprise a solution based on the type of constraint interface.

13. The method of claim 12, wherein the solution is mate, flush, flip the first geometric characteristic, inside, outside, opposed, aligned, forward or reverse wherein a subset of such solutions are available depending on the type of constraint interface selected.

14. The method of claim 1, wherein:

the mating properties comprise a selection icon;

upon selecting the selection icon, control returns to a display window where the first geometric characteristic is selected.

15. The method of claim 1, wherein the mating properties comprise an offset for specifying a distance or angle by which the first component is offset from a second component.

16. The method of claim 1, further comprising creating a composite constraint interface for the first component, wherein:

the composite constraint interface comprises a collection of the first constraint interface and one or more additional constraint interfaces of the first component; and in order for a second component to mate with the first component, each of the constraint interfaces in the collection must be mated with a corresponding constraint interface.

17. The method of claim 16, further comprising displaying a copy of an identical glyph for each of the constraint interfaces in the collection upon the creation of the composite constraint interface.

18. The method of claim 16, wherein the composite constraint interface is created by:

selecting the first constraint interface and the one or more additional constraint interfaces; and selecting an option to create the composite constraint interface.

19. The method of claim 18, wherein the option to create the composite constraint interface is invoked by right clicking a mouse button.

20. The method of claim 16, wherein the composite constraint interface is created through a sequence of dialog windows that assist the user in selecting the first constraint interface and the one or more additional constraint interfaces.

21. The method of claim 1, wherein the first constraint interface is created in a part definition mode of the computer-implemented drawing program.

22. The method of claim 1, wherein the first constraint interface is created in an assembly definition mode of the computer-implemented drawing program.

23. The method of claim 1, further comprising:

selecting a representation of the first constraint interface; and displaying the dialog window to allow editing of the settings.

24. The method of claim 23, wherein displaying the dialog window comprises:

right clicking a mouse button while a cursor is located over the selected representation;

selecting an option to display the dialog window; and displaying the dialog window to allow editing of the settings.

25. The method of claim 23, wherein displaying the dialog window comprises:

double clicking a mouse button while a cursor is located over the selected representation; and displaying the dialog window to allow editing of the settings.

26. The method of claim 1, further comprising displaying a textual identifier of the first constraint interface in a browser window.

27. The method of claim 1, wherein the textual interface is located at a same hierarchical level as features of the component.

28. The method of claim 1, wherein initiating the option comprises:

displaying a menu having an option to create the first constraint interface; and selecting the option.

29. The method of claim 28, wherein the menu is displayed by:

moving a cursor over a first geometric characteristic; and tight clicking a mouse button.

30. The method of claim 1, wherein:

a constraint interface may be identified as either a primary constraint interface or a secondary constraint interface; and the primary constraint interface is used during placement of the first component.

31. The method of claim 1, wherein the first constraint interface may be suppressed.

32. A system for drawing a graphical element comprising:

(a) a computer system having a memory and a data storage device coupled thereto;

(b) a drawing program executing on the computer system, the drawing program configured to:

(i) initiate an option to create a first constraint interface for a first geometric characteristic of a first component;

(ii) in response to the initiation, display a dialog window for specifying settings for the first constraint interface regardless of whether a second constraint interface is currently displayed, wherein the settings define mating properties for how the first geometric characteristic of the first component mates with the second constraint interface;

(iii) persist the first constraint interface of the first geometric characteristic with the first component;

(iv) display glyph within a browser window, wherein the display of the glyph indicates an existence of the first constraint interface and the glyph graphically represents the settings for the first constraint interface; and (v) modify the glyph when the first constraint interface is mated with the second constraint interface.

33. A system for drawing a graphical element comprising:

(a) a computer system having a memory and a data storage device coupled thereto;

(b) a drawings program executing on the computer system, the drawing program configured to:

(i) initiate an option to create a first constraint interface for a first geometric characteristic of a first component;

(ii) in response to the initiation, display a dialog window for specifying settings for the first constraint interface regardless of whether a second constraint interface is currently displayed, wherein the settings define mating properties for how the first geometric characteristic of the first component mates with the second constraint interface; and (iii) persist the first constraint interface of the first geometric characteristic with the first component;

(iv) select a command to place the first component in a display window by selecting the first component; and (v) automatically place the first component in the display window without further user interaction based on the settings of the first constraint interface.

34. The system of claim 33, wherein the automatic placement is enabled through an option that is selectable in a dialog window displayed while the first component is being selected.

35. The system of claim 32, wherein the first constraint interface and second constraint interface each identify a different geometric characteristic but must otherwise be identically configured in order to mate the first component with a second component based on the settings.

36. The system of claim 32, wherein the computer program is further configured to display a glyph located in proximity to the first geometric characteristic in a graphical display of the first geometric characteristic wherein the display of the glyph indicates an existence of the first constraint interface.

37. The system of claim 36, wherein the computer program is further configured to remove the glyph from display once the first constraint interface is mated with the second constraint interface.

38. The system of claim 36, wherein the computer program is further configured to modify the glyph when a cursor is placed over the glyph.

39. The system of claim 32, wherein the computer program is configured to modify the glyph by removing the glyph when the first constraint interface is mated with the second constraint interface.

40. The system of claim 32, wherein one or more icons displayed in the dialog window graphically depict a mating property.

41. The system of claim 40, wherein the one or more icons are displayed on one or more selectable buttons in the dialog window.

42. The system of claim 32, wherein the mating properties comprise a type of constraint interface.

43. The system of claim 42, wherein the type of constraint interface is mate, angle, tangent, insert, rotation-rotation, rotation-translation and translation-translation.

44. The system of claim 42, wherein the mating properties further comprise a solution based on the type of constraint interface.

45. The system of claim 44, wherein the solution is a mate, flush, flip the first geometric characteristic, inside, outside, opposed, aligned, forward or reverse wherein a subset of such solutions are available depending on the type of constraint interface selected.

46. The system of claim 32, wherein:

the mating properties comprise a selection icon; and upon selecting the selection icon, control returns to a display window where the first geometric characteristic is selected.

47. The system of claim 32, wherein the mating properties comprise an offset for specifying a distance or angle by which the first component is offset from a second component.

48. The system of claim 32, wherein:

the computer program is further configured to create a composite constraint interface for the first component;

the composite constraint interface comprises a collection of the first constraint interface and one or more additional constraint interfaces of the first component; and in order for a second component to mate with the first component, each of the constraint interfaces in the collection must be mated with a corresponding constraint interface.

49. The system of claim 48, wherein the computer program is further configured to display a copy of an identical glyph for each of the constraint interfaces in the collection upon the creation of the composite constraint interface.

50. The system of claim 48, wherein the composite constraint interface is created by:

selecting the first constraint interface and the one or more additional constraint interfaces; and selecting an option to create the composite constraint interface.

51. The system of claim 50, wherein the option to create the composite constraint interface is invoked by right clicking a mouse button.

52. The system of claim 48, wherein the composite constraint interface is created through a sequence of dialog windows that assist the user in selecting the first constraint interface and the one or more additional constraint interfaces.

53. The system of claim 32, wherein the first constraint interface is created in a part definition mode of the computer-implemented drawing program.

54. The system of claim 32, wherein the first constraint interface is created in an assembly definition mode of the computer-implemented drawing program.

55. The system of claim 32, wherein the computer program is further configured to:
select a representation of the first constraint interface; and
display the dialog window to allow editing of the settings.

56. The system of claim 55, wherein the computer program is configured to display the dialog window by:
right clicking a mouse button while a cursor is located over the selected representation;
selecting an option to display the dialog window; and
displaying the dialog window to allow editing of the settings.

57. The system of claim 55, wherein the computer program is configured to display the dialog window by:
double clicking a mouse button while a cursor is located over the selected representation; and
displaying the dialog window to allow editing of the settings.

58. The system of claim 32, wherein the computer program is further configured to display a textual identifier of the first constraint interface in a browser window.

59. The system of claim 32, wherein the textual interface is located at a same hierarchical level as features of the component.

60. The system of claim 32, wherein the computer program is configured to initiate the option by:
displaying a menu having an option to create the first constraint interface; and
selecting the option.

61. The system of claim 60, wherein the menu is displayed by:
moving a cursor over a first geometric characteristic; and
right clicking a mouse button.

62. The system of claim 32, wherein:
a constraint interface may be identified as either a primary constraint interface or a secondary constraint interface; and
the primary constraint interface is used during placement of the first component.

63. The system of claim 32, wherein the first constraint interface may be suppressed.

64. An article of manufacture comprising a program storage medium readable by a computer and embodying one or more instructions executable by the computer to perform a method for drawing a graphical element, the method comprising:
initiating an option to create a first constraint interface for a first geometric characteristic of a first component;
in response to the initiation, displaying a dialog window for specifying settings for the first constraint interface regardless of whether a second constraint interface is currently displayed, wherein the settings define mating properties for how the first geometric characteristic of the first component mates with the second constraint interface;
persisting the first constraint interface of the first geometric characteristic with the first component;
displaying a glyph within a browser window, wherein the display of the glyph indicates an existence of the first constraint interface and the glyph graphically represents the settings for the first constraint interface; and
modifying the glyph when the first constraint interface is mated with the second constraint interface.

65. An article of manufacture comprising a program storage medium readable by a computer and embodying one or more instruction executable by the computer to perform a method for drawing a graphical element, the method comprising:
initiating an option to create a first constraint interface for a first geometric characteristic of a first component;
in response to the initiation displaying a dialog window for specifying settings for the first constraint interface regardless of whether a second constraint interface is currently displayed, wherein the settings define mating properties for how the first geometric characteristic of the first component mates with the second constraint interface;
persisting the first constraint interface of the first geometric characteristic with the first component;
selecting a command to place the first component in a display window by selecting the first component; and
automatically placing the first component in the display window without further user interaction based on the settings of the first constraint interface.

66. The article of manufacture of claim 65, wherein the automatic placement is enabled through an option that is selectable in a dialog window displayed while the first component is being selected.

67. The article of manufacture of claim 64, wherein the first constraint interface and second constraint interface each identify a different geometric characteristic but must otherwise be identically configured in order to mate the first component with a second component based on the settings.

68. The article of manufacture of claim 64, the method further comprising displaying a glyph located in proximity to the first geometric characteristic in a graphical display of the first geometric characteristic wherein the display of the glyph indicates an existence of the first constraint interface.

69. The article of manufacture of claim 68, the method further comprising removing the glyph from display once the first constraint interface is mated with the second constraint interface.

70. The article of manufacture of claim 68, the method further comprising modifying the glyph when a cursor is placed over the glyph.

71. The article of manufacture of claim 64, wherein the modifying comprises deleting the glyph when the first constraint interface is mated with the second constraint interface.

72. The article of manufacture of claim 64, wherein one or more icons displayed in the dialog window graphically depict a mating property.

73. The article of manufacture of claim 72, wherein the one or more icons are displayed on one or more selectable buttons in the dialog window.

74. The article of manufacture of claim 64, wherein the mating properties comprise a type of constraint interface.

75. The article of manufacture of claim 74, wherein the type of constraint interface is a mate, angle, tangent, insert, rotation-rotation, rotation-translation or translation-translation.

76. The article of manufacture of claim 74, wherein the mating properties further comprise a solution based on the type of constraint interface.

77. The article of manufacture of claim 76, wherein the solution is a mate, flush, flip the first geometric characteristic, inside, outside, opposed, aligned, forward or reverse wherein a subset of such solutions are available depending on the type of constraint interface selected.

78. The article of manufacture of claim 64, wherein:

the mating properties comprise a selection icon; and upon selecting the selection icon, control returns to a display window where the first geometric characteristic is selected.

79. The article of manufacture of claim 64, wherein the mating properties comprise an offset for specifying a distance or angle by which the first component is offset from a second component.

80. The article of manufacture of claim 64, the method further comprising creating a composite constraint interface for the first component, wherein:

the composite constraint interface comprises a collection of the first constraint interface and one or more additional constraint interfaces of the first component; and in order for a second component to mate with the first component, each of the constraint interfaces in the collection must be mated with a corresponding constraint interface.

81. The article of manufacture of claim 80, the method further comprising displaying a copy of an identical glyph for each of the constraint interfaces in the collection upon the creation of the composite constraint interface.

82. The article of manufacture of claim 80, wherein the composite constraint interface is created by:

selecting the first constraint interface and the one or more additional constraint interfaces; and selecting an option to create the composite constraint interface.

83. The article of manufacture of claim 82, wherein the option to create the composite constraint interface is invoked by right clicking a mouse button.

84. The article of manufacture of claim 80, wherein the composite constraint interface is created through a sequence of dialog windows that assist the user in selecting the first constraint interface and the one or more additional constraint interfaces.

85. The article of manufacture of claim 64, wherein the first constraint interface is created in a part definition mode of the computer-implemented drawing program.

86. The article of manufacture of claim 64, wherein the first constraint interface is created in an assembly definition mode of the computer-implemented drawing program.

87. The article of manufacture of claim 64, the method further comprising:

selecting a representation of the first constraint interface; and displaying the dialog window to allow editing of the settings.

88. The article of manufacture of claim 87, wherein displaying the dialog window comprises:

right clicking a mouse button while a cursor is located over the selected representation;

selecting an option to display the dialog window; and displaying the dialog window to allow editing of the settings.

89. The article of manufacture of claim 87, wherein displaying the dialog window comprises:

double clicking a mouse button while a cursor is located over the selected representation; and displaying the dialog window to allow editing of the settings.

90. The article of manufacture of claim 64, the method further comprising displaying a textual identifier of the first constraint interface in a browser window.

91. The article of manufacture of claim 64, wherein the textual interface is located at a same hierarchical level as features of the component.

92. The article of manufacture of claim 64, wherein initiating the option comprises:

displaying a menu having an option to create the first constraint interface; and selecting the option.

93. The article of manufacture of claim 92, wherein the menu is displayed by:

moving a cursor over a first geometric characteristic; and right clicking a mouse button.

94. The article of manufacture of claim 64, wherein:

a constraint interface may be identified as either a primary constraint interface or a secondary constraint interface; and the primary constraint interface is used during placement of the first component.

95. The article of manufacture of claim 64, wherein the first constraint interface may be suppressed.

* * * * *

UNITED STATES PATENT AND TRADEMARK OFFICE
CERTIFICATE OF CORRECTION

PATENT NO. : 6,907,573 B2
DATED : June 14, 2005
INVENTOR(S) : Scott T. Kohls et al.

It is certified that error appears in the above-identified patent and that said Letters Patent is hereby corrected as shown below:

Column 16,
Line 67, "tight" should read -- right --.

Column 18,
Line 26, "and" should read -- or --.

Column 20,
Line 11, "instruction execurable" should read -- instructions executable --.

Signed and Sealed this

Eighteenth Day of October, 2005

JON W. DUDAS
*Director of the United States Patent and Trademark Office*